United States Patent
Vogtmeier et al.

(10) Patent No.: US 10,755,488 B2
(45) Date of Patent: Aug. 25, 2020

(54) SYSTEMS, METHODS, AND APPARATUSES FOR MODIFYING MODEL DATA FOR PRINTING THREE-DIMENSIONAL ANATOMICAL OBJECTS

(71) Applicant: KONINKLIJKE PHILIPS N.V., Eindhoven (NL)

(72) Inventors: Gereon Vogtmeier, Aachen (DE); Eike Gerhard Gegenmantel, Aachen (DE); Molly Lara Flexman, Melrose, MA (US)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/276,789

(22) Filed: Feb. 15, 2019

(65) Prior Publication Data
US 2019/0259218 A1 Aug. 22, 2019

Related U.S. Application Data

(60) Provisional application No. 62/631,971, filed on Feb. 19, 2018.

(51) Int. Cl.
*G06T 19/20* (2011.01)
*G06T 17/10* (2006.01)
(Continued)

(52) U.S. Cl.
CPC ............ *G06T 19/20* (2013.01); *G06T 15/005* (2013.01); *G06T 15/08* (2013.01); *G06T 17/10* (2013.01);
(Continued)

(58) Field of Classification Search
CPC ......... G06T 15/00; G06T 15/08; G06T 17/00; G06T 17/10; G06T 19/20; G06T 2210/41
See application file for complete search history.

(56) References Cited

U.S. PATENT DOCUMENTS

2015/0360421 A1* 12/2015 Burhop .............. G05B 19/4099
264/401
2016/0092605 A1 3/2016 McCrae et al.
(Continued)

FOREIGN PATENT DOCUMENTS

| WO | 2016097920 A1 | 6/2016 |
| WO | 2017106294 A2 | 6/2017 |
| WO | 2017140611 A1 | 8/2017 |

OTHER PUBLICATIONS

J. Vanek, J. A. G. Galicia, and B. Benes; Clever Support: Efficient Support Structure Generation for Digital Fabrication; Jul. 2014; Eurographics Association; In the Proceedings of the Eurographics Symposium on Geometry Processing 2014; vol. 33 (2014), No. 5; pp. 117-125. (Year: 2014).*

*Primary Examiner* — Jeffery A Brier

(57) ABSTRACT

The described implementations relate to systems, methods, and apparatuses for providing segmented models of objects that have been rendered in three-dimensional space. Furthermore, the segmented models can be automatically assigned connectors for allowing the models to be assembled and disassembled. The models can be generated based on object data generated from scans of an object, such as an anatomical body. A selected area of interest can be selected from the object data, and the object data can be cropped in order to provide a more concise volume from which to generate a model, such as at a 3D printer. The structure characterized by the object data can be processed to determine suitable locations for connectors that can allow the model to be disassembled while also providing an unobstructed view of the selected area of interest.

20 Claims, 6 Drawing Sheets

(51) Int. Cl.
*G06T 15/00* (2011.01)
*G06T 15/08* (2011.01)
(52) U.S. Cl.
CPC ...... *G06T 2210/41* (2013.01); *G06T 2210/62* (2013.01)

(56) References Cited

U.S. PATENT DOCUMENTS

| | | | |
|---|---|---|---|
| 2016/0093100 A1* | 3/2016 | Ju | G06T 19/20 700/98 |
| 2017/0112592 A1 | 4/2017 | Groscurth et al. | |
| 2017/0217102 A1 | 8/2017 | Mansi et al. | |

* cited by examiner

SYSTEMS, METHODS, AND APPARATUSES FOR MODIFYING MODEL DATA FOR PRINTING THREE-DIMENSIONAL ANATOMICAL OBJECTS

CROSS-REFERENCE TO RELATED APPLICATION

This application claims priority to and the benefit of U.S. Provisional Application Ser. No. 62/631,971, filed on Feb. 19, 2018, which is hereby incorporated by reference in its entirety.

TECHNICAL FIELD

The present disclosure is directed generally to three-dimensional printing of anatomical objects. More particularly, but not exclusively, implementations set forth herein relate to modifying model data to incorporate structures and separable layers that can be used by a three-dimensional printer for printing a separable three-dimensional model of an anatomical object.

BACKGROUND

Anatomical models can be used by clinicians for explaining various features of an anatomical body, such as a human body. However, the manufacturability of certain anatomical models can be limited by the complexity of certain features of an anatomical object. For instance, a clinician may request an anatomical model of an area of a body that does not inherently have segments and structures that can be readily manufactured into a rigid three-dimensional model to provide such structures. As a result, computational resources and energy can be wasted when a user must repeatedly draw a three-dimensional rendering of an object. Furthermore, delays in model creation can lead to harm to patients that may be relying on clinicians to analyze a model to provide a diagnosis.

SUMMARY

The described implementations relate to systems, methods, and apparatuses for providing segmented models of objects that have been rendered in three-dimensional space. In this way, the segmented models can be printed in three dimensions in order to provide exhibits from which to understand the objects. For example, a segmented model can correspond to an anatomical model of an organ in the body, and the segmented model can be printed by a three-dimensional printer in a way that allows the printed segmented model to be disassembled and reassembled. By providing a segmented model that includes these features, clinicians can more readily demonstrate how certain areas of interest in the body are disposed throughout different layers of the body.

Three-dimensional model data can be generated through a variety different processes related to scanning or characterizing objects. Certain anatomical objects, such as features of a human body, can be scanned through a magnetic resonance imaging (MRI) process and/or a computer tomography (CT) imaging, interventional X-ray, digital X-ray radiogrammetry, positron emission tomography, single-photon emission computerized tomography, ultrasound imaging, and/or any other process through which a three-dimensional rendering of an object can be generated. Resulting data from scanning such anatomical objects can characterize various features of anatomical objects such as, for example, layers of skin, location of organs, intersections of layers, tumor locations, injury locations, diseased locations, and/or any other features that can be considered an area of interest by a clinician or other user.

In order to prepare the model data in a way that allows a resulting three-dimensional model to be segmented and/or mounted, the model data can be processed to identify portions of the object characterized by the model data that correspond to different features of the object.

In some implementations, a method implemented by one or more processors is set forth as including operations such as receiving model data corresponding to a three-dimensional rendering of an object that includes a plurality of layers that are identified by the model data. The method can further include identifying a location corresponding to overlapping and non-intersecting portions of a first layer of the plurality of layers and a second layer of the plurality of layers, and modifying, in response to identifying the location, the model data to incorporate structural data that characterizes a support structure configured to be integral to the first layer and the second layer at the identified location. The structural data can further characterize a detachable connector. The structural data can include a first connector portion data that characterizes a first portion of the detachable connector that is connected to the first layer, and second connector portion data that characterizes a second portion of the detachable connector. The detachable connector can include a first volume and a second volume, the first volume at least partially enveloping the second volume. The method can also include an operation of receiving a selection for incorporating a bounding region into the model data. The bounding region can be configured to isolate regions of the plurality of layers from the model data. The method can further include receiving a separate selection of an area of interest within the bounding region. Identifying the location can include locating a portion of the model data that is separate from the area of interest. The area of interest can correspond to a third layer of the plurality of layers and is disposed between the first layer and the second layer. The method can further include modifying, in response to receiving the separate selection of the area of interest, the model data to incorporate additional structural data that characterizes a separate support structure configured to be integral to at least the third layer.

In other implementations, a method implemented by one or more processors is set forth as including operations such as receiving model data corresponding to a three-dimensional rendering of an object. The three-dimensional rendering includes a plurality of layers that are identified by the model data. The method can also include determining an area of interest corresponding to a portion of a first layer of the plurality of layers, modifying the model data to include bounding region data that characterizes a bounded region surrounding the portion of the first layer, and when the portion of the first layer is disposed between a second layer of the plurality of layers and a third layer of the plurality of layers: modifying the model data to incorporate support structure data that characterizes a support structure that is integral to at least the first layer and disposed within the bounded region. The method can further include modifying the model data to include support structure data that characterizes one or more three-dimensional support structures integral to at least one layer of the plurality of layers. The method can also include modifying the model data to incorporate support plate structural data that characterizes a support plate that includes one or more three-dimensional support structures configured to support at least one layer of the plurality of layers. The method can also include, when the second layer is an outer-most layer relative to the support plate, generating material data corresponding to the second layer that identifies the second layer as an at least partially transparent layer. The support structure that can be integral to at least the first layer is a detachable connector and the one or more three-dimensional support structures of the support plate are fixed connectors that are different than the detachable connector. The detachable connector can be characterized by volume data that identifies a first volume at least partially enveloped by a second volume.

In yet other implementations, a method implemented by one or more processors is set forth as including operations such as receiving a selection of an area of interest of a three-dimensional rendering of an object. The three-dimensional rendering can include a plurality of layers. The method can further include determining that model data, corresponding to the three-dimensional rendering of the object, includes an outer surface and an inner surface. The outer surface can be integral to a first layer of the plurality of layers of the object and the inner surface can be integral to a second layer of the plurality of layers of the object. The method can also include modifying the model data to incorporate support structure data. The support structure data can characterize a support structure that is integral to the second layer of the plurality of layers. The support structure can be configured to support at least one other layer of the plurality of layers. The method can also include, when the area of interest is disposed between the first layer and the second layer, modifying the model data to incorporate additional support structure data to characterize an additional support structure that is at least partially integrated into the first layer or the second layer. The method can also include, when the area of interest is integral to the first layer, modifying the model data to incorporate the additional support structure data to characterize a separate support structure that is at least partially integrated into an area of the first layer that is separate from the area of interest. The method can also include, when the area of interest is integral to the first layer, modifying the model data to incorporate cross-sectional data to characterize a first portion and a second portion of the first layer, wherein the first portion and the second portion are detachable portions of the first layer. Modifying the model data to incorporate the cross-sectional data can include identifying a perimeter of a cross-section characterized by the cross-sectional data on which to incorporate the separate support structure. The method can also include providing, based on determining that the model data includes the outer surface, material data that designates the first layer as an at least partially transparent layer. The object can be an anatomical object and the model data is generated by a scanning device.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

FIGS. 1A, 1B, 1C and 1D illustrate various implementations for modifying model data during preparation of a three-dimensional object for use by a clinician or other user. The modifications described with respect to FIGS. 1A, 1B, 1C and 1D, as well as any other descriptions discussed herein, can be embodied as computer-readable instructions and/or performed by one or more processors that are capable of accessing model data corresponding to a three-dimensional rendering of an object. The model data can be generated based on a scan of a three-dimensional object using one or more sensors capable of processing or being responsive to various characteristics of the object. For example, the rendered object 100 can correspond to a three-dimensional CT scan of a chest area of a human being. It should be noted however, that many anatomical details have been left out in order to focus on the processes discussed herein. The rendered object can include a skeletal structure 110, an area of interest 112, which can correspond to a gallbladder, and a liver 118. The rendered object 100 can optionally be presented at a user interface of the computing device that includes the one or more processors that have been tasked with preparing the rendered object for three-dimensional printing. In order to prepare the rendered object 100, the user can select an area of interest 112 from which the one or more processors can generate a printable selection of the rendered object 100. For example, the user can select the gallbladder, which is located below the liver 118, as the area of Interest 112.

Figure 1A:
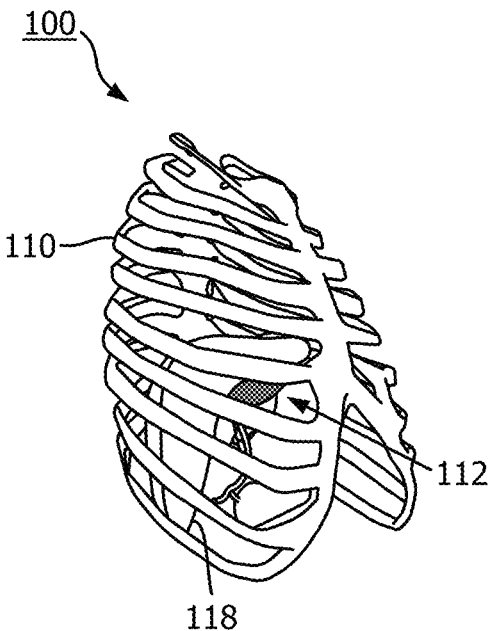
FIGS. 1A, 1B, 1C and 1D illustrate various implementations for modifying model data during preparation of a three-dimensional object for use by a clinician or other user.
Figure 1B:
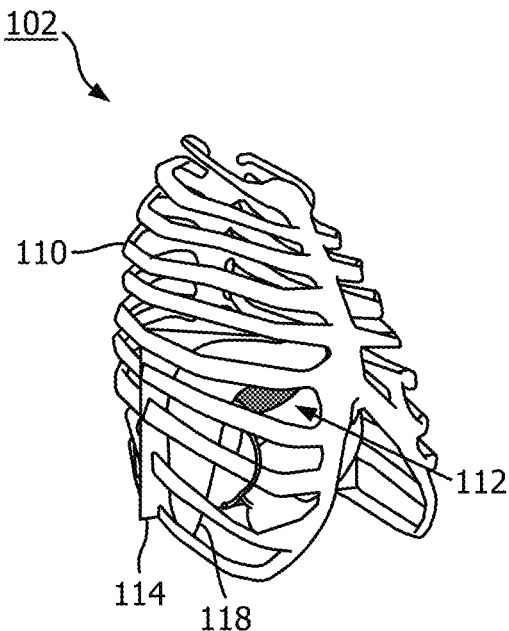

In response to receiving the selection of the area of interest 112, the one or more processors can generate or identify a surface upon which layers of the printed object will rest, or at least depend on for support when the printed object is assembled. In order to identify the surface on which the layers of the printed object will rest, the one or more processors can identify an exterior surface of the rendered object 100 and an interior surface of the rendered object 100. For example, the exterior surface can be the exterior of the skeletal structure 110, and the interior surface can be a portion of the liver 118. The one or more processors can then be tasked with identifying whether the area of interest 112 is between the exterior surface and the interior surface. When the area of interest 112 is between the exterior surface and the interior surface, the interior surface can be selected as a backing surface for the printed object. Alternatively, and/or in some implementations, a back plate 114 can be generated, as illustrated in FIG. 1B, which shows a modified rendered object 102. The back plate 114 can be generated to abut and/or intersect the interior surface of the modified rendered object 102. For instance, when the interior surface is a portion of an organ, such as the liver 118, the back plate 114 can extend over a surface of the liver 118 that faces away from the area of interest 112. The one or more processors can automatically select the surface of the liver 118 as the back of the surface of the printed object based on how a surface area of the skeletal structure 110 behind the area of interest 112 compares to the surface area of the liver 118 behind the area of interest 112. Specifically, the one or more processors can identify one or more layers that are behind the area of interest 112, identify surface areas corresponding to the one or more layers, and select the surface having the largest surface area as being the backing surface for the printed object. Alternatively, the back plate 114 can be merely generated to extend behind one or more layers of the area of interest 112.

Figure 1C:
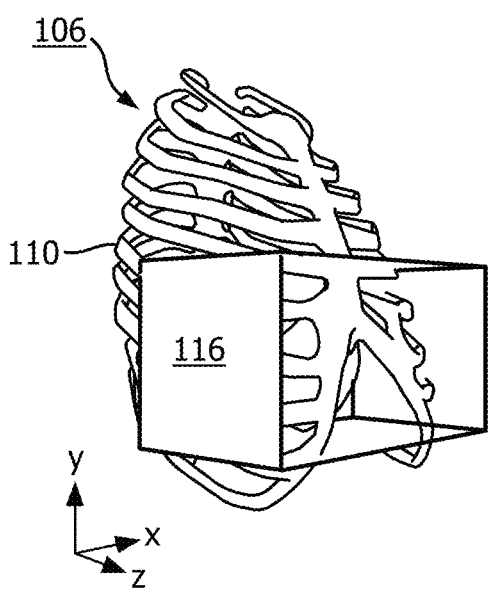

The model data can be modified such that the rendered object 100 can include a bounded region 116, as illustrated in FIG. 1C, which provides a modified rendered object 106. The one or more processors can be tasked with generating the bounded region 116 to extend beyond the exterior most surface of the modified rendered object 106 in the z-direction (see directional arrow "z" of FIG. 1C). However, in some implementations, the one or more processors can move the exterior boundary of the bounded region 116 in order to reduce a length of the bounded region in the z-direction such that the bounded region does not include the exterior most surface of the modified rendered object 106. The one or more processors can alternatively be tasked with generating the bounded region 116 to extend beyond the exterior most surface of the modified rendered object 106 in the x-direction (see directional arrow "x" of FIG. 1C) and/or the y-direction (see directional arrow "y" of FIG. 1C). However, in some implementations, the one or more processors can optimize the bounded region to ensure that the area of interest 112 is completely within the bounded region 116 and the back plate 114 is sufficiently sized for supporting the area of interest 112, as well as any other layers within the bounded region 116. For example, the one more processors can generate the bounded region 116 such that an exterior most surface of the modified rendered object 106 intersects the bounded region 116. In some implementations, the one or more processors can generate the bounded region 116 such that the exterior most surface of the modified rendered object 106 intersects the bounded region 116 at opposing lateral portions of the bounded region 116.

In some implementations, the bounded region 116 can be generated based on patient information that is accessible to the one or more processors responsible for generating the modified of rendered object 106. For example, patient information can include medical history, demographic information, treatment information, data from other medical scans, and/or any other information that can be useful when generating the bounded region of a three-dimensionally rendered object. In some implementations, the bounded region 116 can be generated by the one or more processors based on whether a floating object is being intersected by the bounded region 116. A floating object can be one that is suspended within the rendered object without apparent support for the floating object by a non-gas or non-fluid medium. When a floating object is being intersected by a proposed bounded region 116 and the floating object is not part of the area of interest 112, the bounded region 116 can be regenerated as part of a subsequent iteration such that the bounded region 116 does not include a portion that intersects the floating object. However, when the floating object is being intersected by the bounded region 116 and the floating object at least partially overlaps the area of interest 112, the bounded region 116 can be left to intersect the floating object, or be extended past the floating object. In this way, various layers near the area of interest 112 can be left in the modified rendered object 106 such that they may be present in the object that is printed using the modified model data.

Figure 1D:
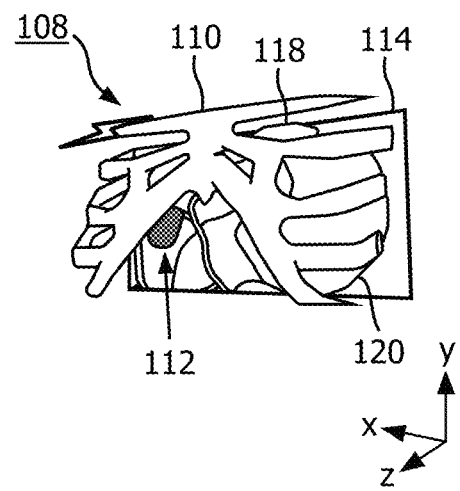

When the bounded region 116 has been finalized, the one or more processors can identify model data corresponding to portions of the modified rendered object 106 that are outside of the bounded region 116. The one or more processors can be tasked with automatically deleting or otherwise removing the other portions of the modified rendered object 106 in response to the bounded region 116 being finalized. For example, when the modified rendered object 106 is being presented at a user interface, such as a display panel of a computing device, the portions of the modified rendered object 106 outside of the bounded region 116 can be removed from display at the user interface. A finalized rendered object 108 can therefore be left for viewing at the user interface and/or for printing at a three-dimensional printer. For example, the one or more processors can convert the data corresponding to the finalized rendered object 108 to a format that can be processed by a three-dimensional printer. In some implementations, the modified rendered object 106 can be processed to determine where connector(s) (i.e., support structure(s)) can be located for supporting various layers of the printed object. For example, the back plate 114, as illustrated in FIG. 1D, can be analyzed by the one or more processors to determined how many layers of the finalize rendered object 108 abut the back plate 114. The one or more processors can therefore determine the surfaces of various organs that are disposed within the bounded region 116 and are above the back plate 114 in the z-direction. Such surfaces can include a surface of a stomach 120, a surface of a liver 118, and a surface of a skeletal structure 110. The one or more processors can identify the abutting surfaces, access a library of connector data to determine suitable connectors for each surface, and assign a suitable connector for each surface. For example, a suitable connector can be one that provides sufficient friction for attaching each surface to the back plate 114 such that a weight of an object corresponding to the surface will not damage the connector or any other portion of the printed object. In some implementations, the one or more processors can determine that an object, such as the stomach 120, is sandwiched between the skeletal structure 110 and the back plate 114, therefore one or more connectors may only be needed at the surface of the stomach 120 that faces the back plate 114 because the skeletal structure 110 provides adequate friction and/or pressure at the opposite side of the stomach 120.

Figure 2:
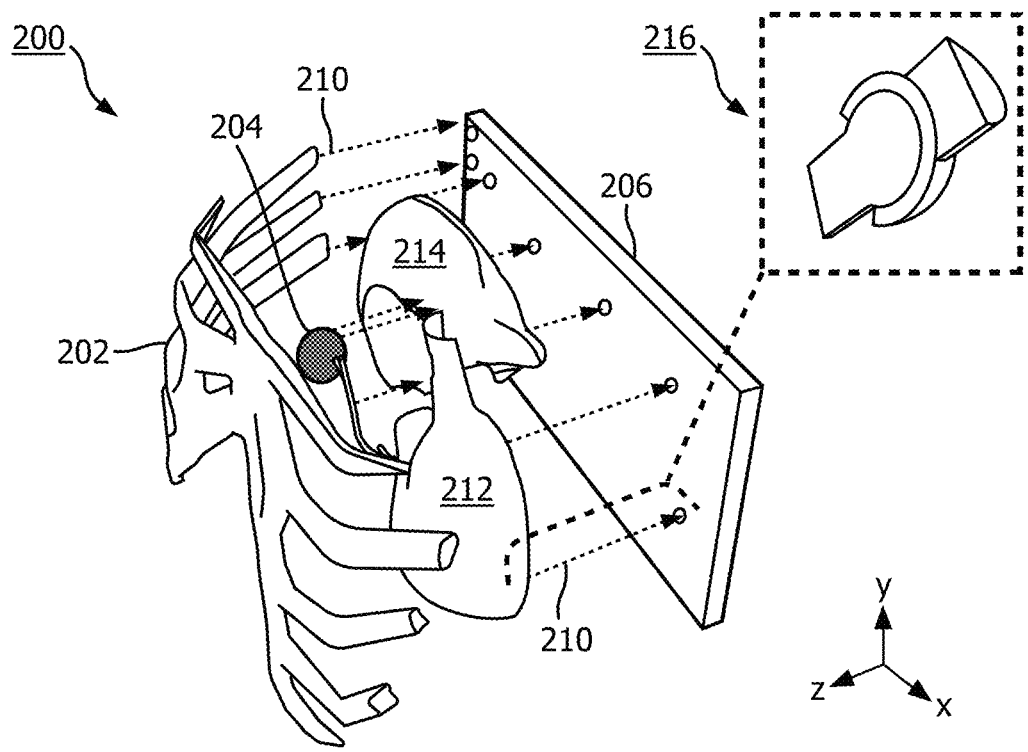
FIG. 2 illustrates a perspective view of a model corresponding to a printed object and/or a rendered object that can be generated by one or more processors according to embodiments discussed herein.

FIG. 2 illustrates a perspective view 200 of a model corresponding to a printed object and/or a rendered object that can be generated by one or more processors according to embodiments discussed herein. Specifically, the model can be generated by one or more operations or tasks discussed herein. For example, the model can correspond to a portion of a scanned anatomical body, such as a human body. Portions of the model conclude a skeletal structure 202, an area of interest 204 selected by a user, a first organ 214, such as a liver, and a second organ 212, such as a stomach. The area of interest 204 can be selected by a user and can correspond to another organ of the body, such as a gallbladder. Because the selected area of interest 204 is located between two layers, specifically the skeletal structure 202 and the first organ 214, the one or more processors tasked with generating a model can assign connectors 210 that will not obstruct a view of the selected area of interest 204. For instance, the connectors 210 can extend from the selected area of interest in a z-direction and connect to the first organ 214. The one or more processors can also assign connectors 210 to each of the layers for connecting each of the layers to another layer or the back plate 206. In some implementations, the connectors 210 can include a snap and lock connector 216, which can provide more friction for a connection between one or more layers of the model. In some implementations, the one or more processors can assign connectors that are distant from the selected area of interest 204 in order to not obstruct a view of the selected area of interest 204. For example, as illustrated in the perspective view 200, connectors 210 extending from the skeletal structure 202 are connected to the skeletal structure 202 at a location that is non-overlapping relative to the selected area of interest 204. Furthermore, in order to save material and provide a more rigid structure, connectors assigned to the second organ 212 can be assigned to a perimeter of the second organ 212, and the second organ 212 can be generated as a hollow volume. Additionally, the back plate 206 can be generated by the one or more processors to intersect the second organ 212 at an area that maximizes a cross-sectional perimeter of the second organ 212 and/or a length of a cross-sectional perimeter of the first organ 214. This can ensure that the selected area of interest 204 has adequate support, and can be viewed relative to other organs in the anatomical body.

Figure 3:
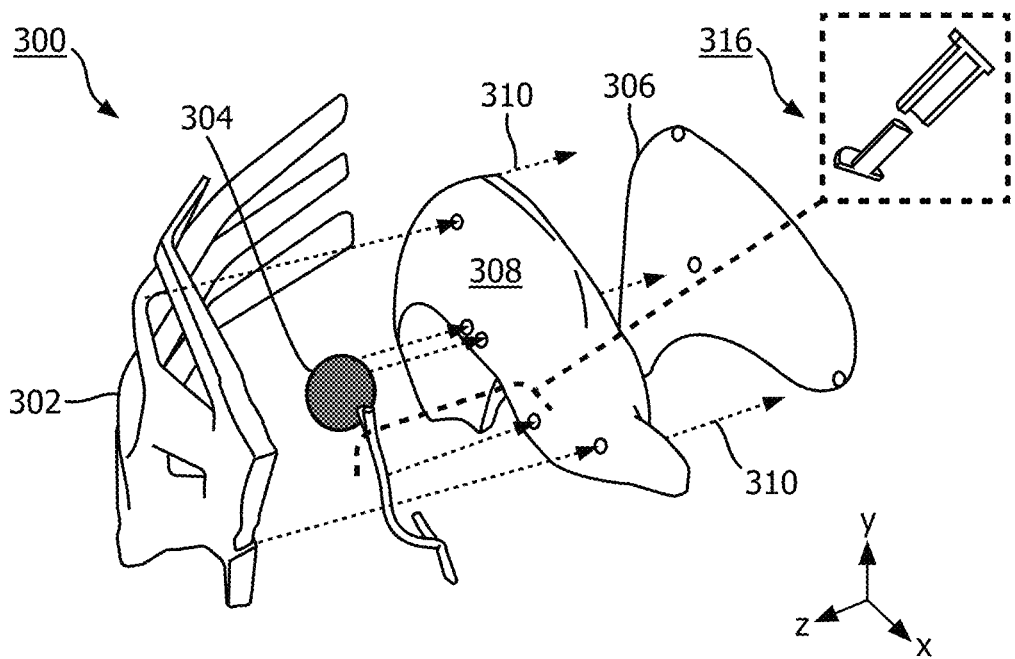
FIG. 3 illustrates a perspective view of a model generated by one or more processors according to embodiments discussed herein.

FIG. 3 illustrates a perspective view 300 of a model generated by one or more processors according to embodiments discussed herein. Specifically, the model can include a skeletal structure 302, a selected area of interest 304, an organ 308, multiple connectors 310 connected at each layer, and a back plate 306. The back plate 306 can be generated based on the one or more processors determining that a portion of a bounded region intersecting the organ 308 corresponds to a largest area of a layer that was intersected by the bounded region. Therefore, the back plate 306 can be generated such that each of the other layers (i.e., the skeletal structure 302, the selected area of interest 204, and the organ 308) each can be mounted directly or indirectly to the back plate 306.

In some implementations, when a portion of the bounded region intersects a layer corresponding to a largest area of intersection, the layer can be designated as the support structure upon which the other layers will rest. For example, in some implementations, the organ 308 can be designated as the back plate upon which the skeletal structure 202 and the selected area of interest 304 can rest. Furthermore, as a result, the organ 308 can be modified by the one or more processors to include connectors 310. Alternatively, if the back plate 306 is generated separate from the organ 308, the back plate 306 can be modified to include connectors 310. The connectors can be a rod and aperture connector 316, and/or a snap and lock connector 216. For example, because the skeletal structure 202 is located in front of the selected area of interest 304 relative to the back plate 306, the skeletal structure 202 can be assigned rod and aperture connectors. Furthermore, because the organ 308 is located on the same side of the selected area interest 304 as the back plate 206, the organ 308 can be assigned snap and lock connectors 216. In this way there will be less friction exhibited when the layers in front of the selected area of interest 304 are being disassembled from the model, and more friction will be exhibited when layers behind the selected area of interest 304 are being disassembled from the model.

Figure 4:
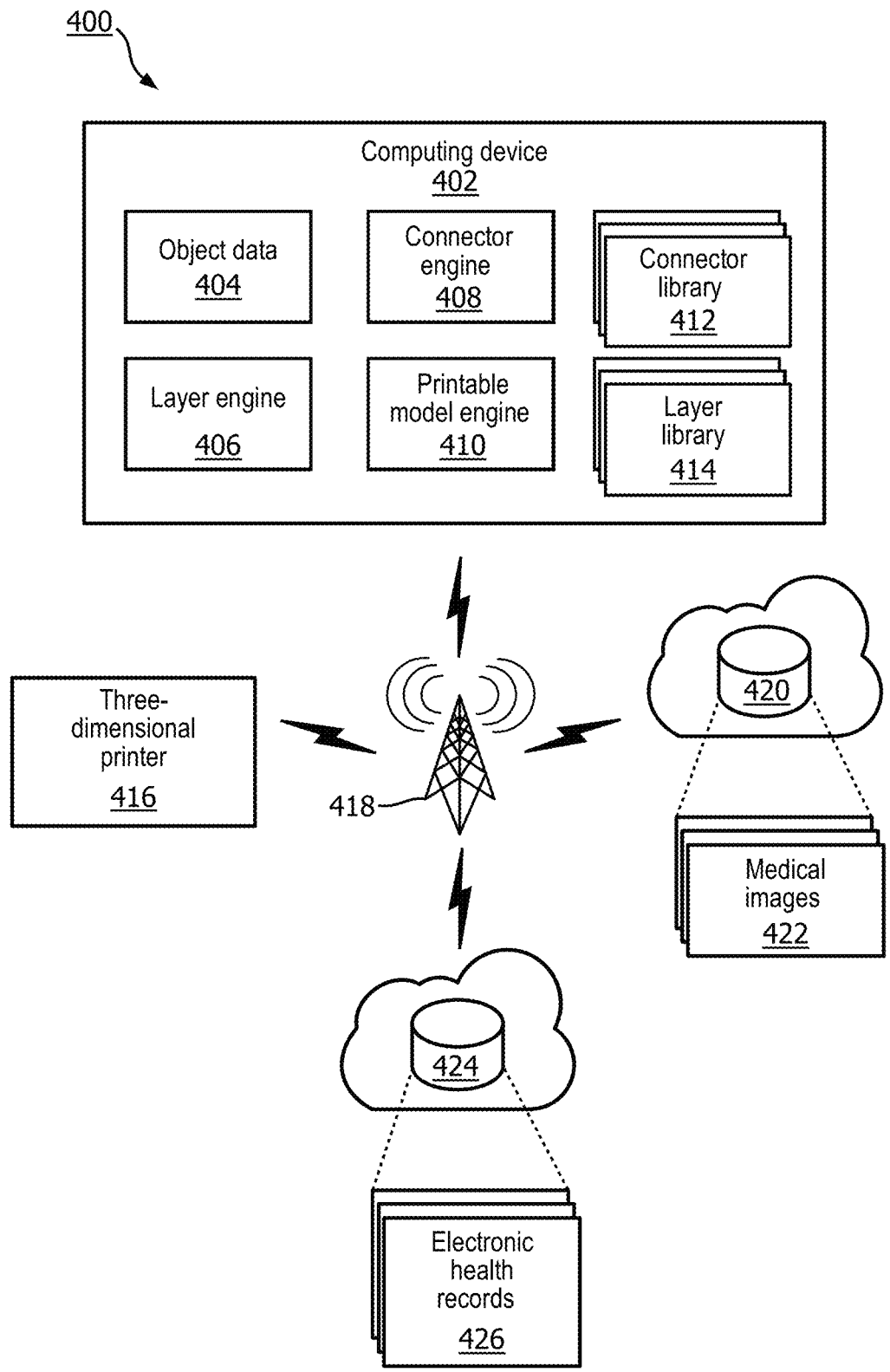
FIG. 4 illustrates a system for processing object data to distinguish various layers, and incorporate structures for allowing a printed model to be assembled and disassembled.

FIG. 4 illustrates a system 400 for processing object data 404 to distinguish various layers, and incorporate structures for allowing a printed model to be assembled and disassembled. The system 400 can include a computing device 402 capable of processing object data 404 that is generated and/or received by the computing device 402. The computing device 402 can include one or more processors, memory, peripheral devices for controlling the computing device 402, a display panel such as a touch display, and/or any other apparatus or module capable of being used to assist in processing model data. Furthermore, the computing device 402 can execute one or more instructions for performing operations and/or tasks discussed herein. The object data 404 can be based on one or more scans of an object by one or more sensors, and can be modifiable by the computing device 402 according to various operations. For example, the computing device 402 can be in communication with a remote device 420 over a network 418, such as the internet. The remote device 420 can store medical images 422, which can be two-dimensional and/or three-dimensional images corresponding to one or more different types of scanning techniques. For instance, the medical images 422 can be CT scanned images, and the object data 404 can correspond to a three-dimensional rendering of the CT scans received from the remote device 420.

The computing device 402 can process the object data 404 using a layer engine 406. An engine can refer to one or more applications, modules, operations, and/or any other computer executable script. The layer engine 406 can access the object data 404 and generate property data, which can define properties of each layer of the object data 404. For example, the object data 404 can be based on a scan of layers of tissue of the human body. The layer engine 406 can process the object data 404 to distinguish the various tissue layers within the object data 404 and/or tag one or more data objects of the object data 404 with additional information related to properties of a respective layer. In some implementations, when processing the object data 404, the layer engine 406 can access a layer library 414. The layer library 414 can include data that provides a correspondence between data from various scans to properties of layers of material. For example, the layer engine 406 can use the object data 404 to determine a density for each layer described by the object at 404, and the layer library 414 can provide a correspondence between the density and a type of layer. Furthermore, the layer engine 406 can use the object data 404 to determine dimensions and/or other properties for each layer described by the object data 404, and the layer library 414 can provide a correspondence between the dimensions and/or other properties and a type of layer. In this way, a rendering of the object data 404 at a display panel of the computing device 402 can provide distinguishing features such that the user can select an area of interest at one or more layers more accurately.

In some implementations, the computing device 402 can be tasked with generating a back plate as well as connectors for incorporating into the object data 404, which can thereafter be used to print an object at a three-dimensional printer 416. For example, a user can select an area of interest by selecting a portion of the object data 404 that is being rendered at a display panel of the computing device 402. In response to receiving the selection of the area of interest, the computing device 402 can generate a base plate from which the various layers of the object data 104 can rest upon. Furthermore, the user can select a distance of the base plate from the area of interest, and any layers or objects behind the base plate can be automatically designated as not part of the object to be printed at the three-dimensional printer 416.

In some implementations, generating data that characterizes the base plate can include initially generating a box that can at least partially envelop the selected area of interest. The layer engine 406 can then determine at least two largest areas of the box, based on a number of layers and/or other data points characterizing the areas of the box. A largest number of boxes corresponding to a layer that faces outside of the body of the object can be designated as the top of the printed model. A largest number of voxels corresponding to a layer that faces away from the top of the printed model can be designated as the base plate or as a layer that is directly adjacent or attached to the base plate. In response to identifying the base plate and top of the printed model, in some implementations, the user can be queried to confirm the box, the base plate, and/or the top of the printed model.

In some implementations, the user can adjust the location of the box with the dimensions of the box remaining static. In other implementations, the generation of the box in the selection of the area of interest can be performed without user interaction. For example, the computing device 402 can access a remote device 424 that stores electronic health records 426. The object data 404 can be compared to the electronic health records 426 to determine a diagnosis of a patient associated with the object data 404. Based on the diagnosis, such as a tumor at a particular location, the computing device 402 can select the area of interest by scanning the object data 404 and comparing the object data to contents of the layer library 414 to determine whether the object data 404 characterizes a layer corresponding to the diagnosis. The layer can then be considered the selected area of interest, and the box can be generated accordingly, to at least partially envelop the selected area of interest while leaving enough structure for the printed object to be structurally sound.

In response to the object data 404 being modified to incorporate data that characterizes a base plate, the connector engine 408 can process the modified object data 404 to determine where connectors can be placed for supporting the various layers and objects on top of the base plate. The connector engine 408 can access a connector library 412, which can define one or more different types of connectors that can be used for connecting and/or placing layers on top of the base plate. For example, the connector engine 408 can be tasked with providing default bottom-top connections at outer positions of the back plate. The connector engine 408 can identify locations for bottom-top connections by identifying where an uninterrupted path exists between the back plate and an outermost layer of the object data 404. If there are no uninterrupted paths between the back plate and the outermost layer, bottom-top connections can be designated at equidistant locations relative to each other on the back plate, and extend between the back plate and a closest layer to the bottom top connection.

The connector engine 408 can further determine connector dimensions for each connector that has been designated for the back plate and/or any other layer of the object. Connector dimensions can be based on a number of layers identified, types of layers identified by the layer engine 406, size of the area of interest, size of other layers relative to the area of interest, and/or any other property or dimension of the object data 404. For example, dimensions of a connector assigned by the connector engine 408 can be based on a total number of connectors to be assigned to the object data and/or a total weight or volume of the object to be printed.

The connector engine can further determine whether any objects or layers between the base plate and the outermost layer, such as the skin, are not directly or indirectly connected to the base. For all layers or objects that are not directly or indirectly connected to the base plate, the connector engine 408 can determine a center line for the object's or layer's main branches. The connector engine 408 can then designate connectors to be disposed over the center align and separated by a predetermined distance, or a distance that is based on properties of the layer. For example, a layer having a thickness that is less than, equal to, or greater than a particular threshold can receive a connector corresponding to that particular threshold. Furthermore, a location of a connector on a center line can be automatically adjusted to be separated by a distance from the selected area of interest.

In some implementations, computing device 402 can include a printable model engine 410. The printable model engine 410 can process the modified object data 404, which can identify the base plate, outermost layer, as well as any connectors that have been generated by the connector engine, and virtually test the object data 404 for structural integrity. If the structural integrity of the object data 404 does not meet a particular threshold or score stored at the computing device 402, the object data 404 can be regenerated or portions of the object data 404 can be remodified and retested by the printable model engine 410. For example, the printable model engine 410 can communicate with the connector engine 408 to adjust a location and/or a dimension of one or more connectors characterized by the object data 404. Once the connector engine has completed redefining one or more characteristics of one or more connectors, the printable model engine 410 can reprocess the modified object data 404. When the modified object data 404 meets the threshold or score for structural integrity, the computing device 402 can transmit the modified object data 404 to the three-dimensional printer 416. The three-dimensional printer 416 can then print the modified object data 404 into a printed object. Any errors that occur during the printing of the object can be relayed back to the computing device 402 in order to optimize subsequent generations of object data and printing of objects.

Figure 5A:
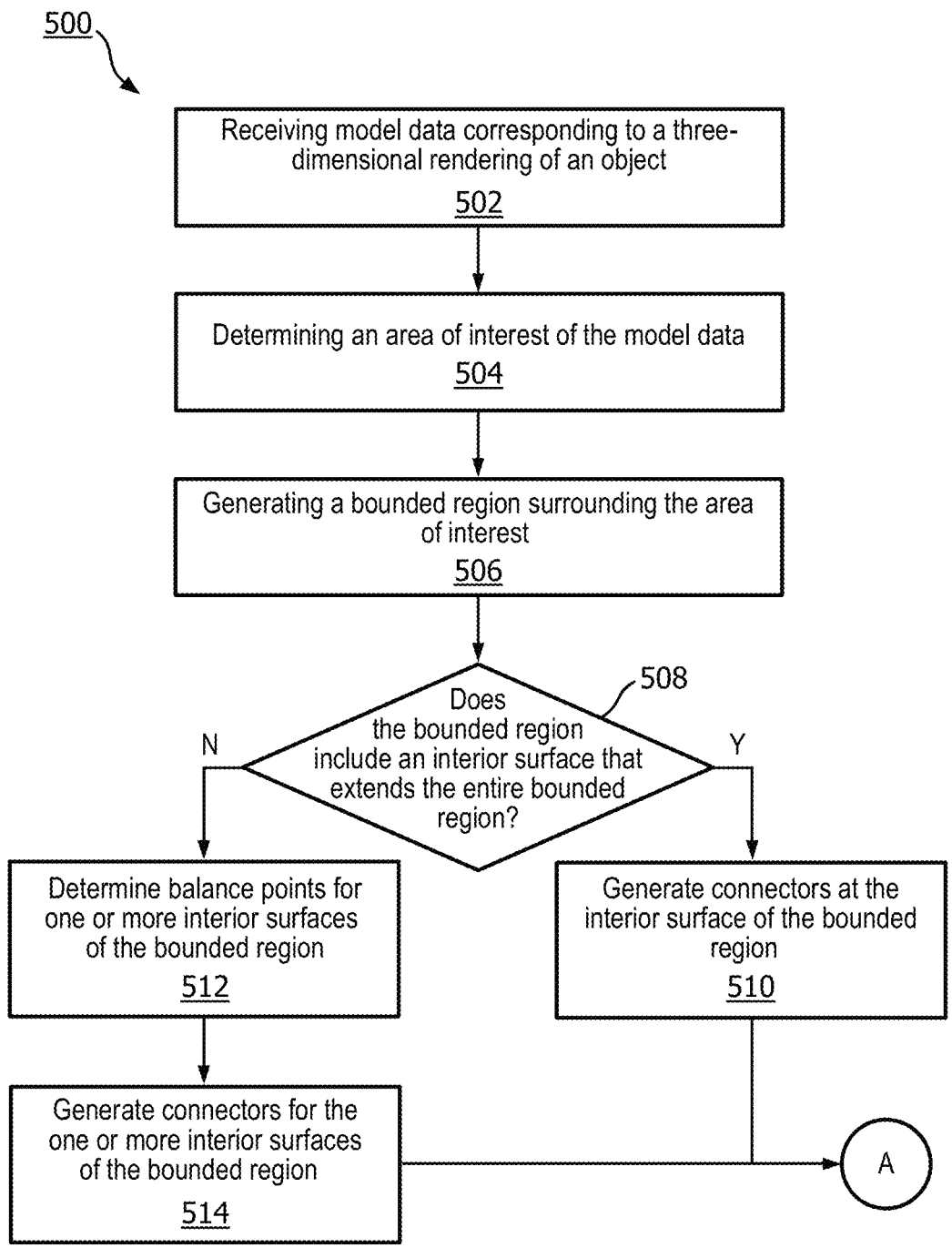
FIGS. 5A and 5B illustrate a method for providing model data that can be used to generate a three-dimensional object that includes separable layers in order to provide a more detailed view of one or more areas of interest of the object.
Figure 5B:
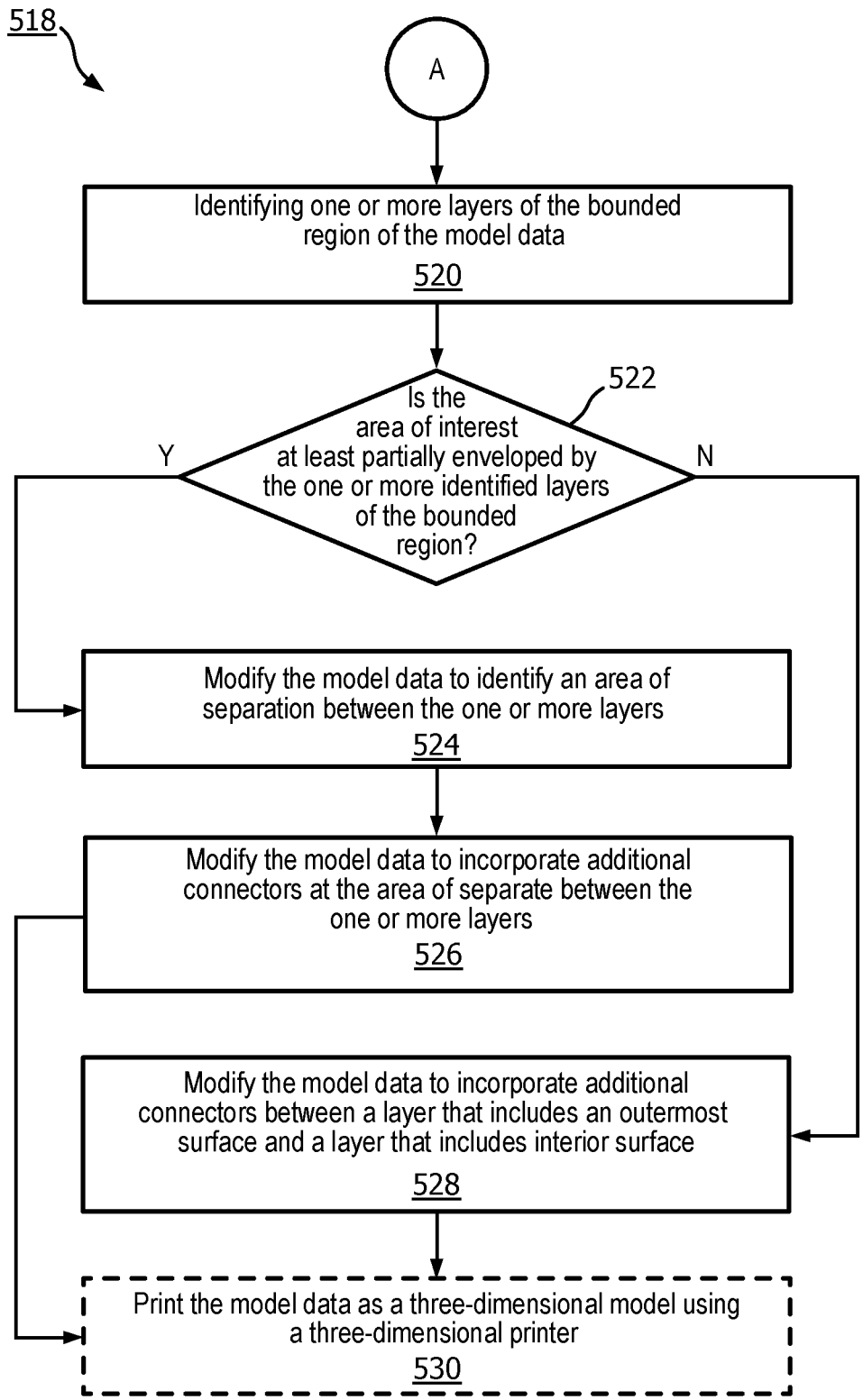

FIGS. 5A and 5B illustrate a method 500 for providing model data that can be used to generate a three-dimensional object that includes separable layers in order to provide a more detailed view of one or more areas of interest of the object. The method 500 can be performed by one or more applications, computing devices, and/or any other apparatus or module capable of processing model data. The method 500 can include an operation 502 of receiving model data corresponding to a three-dimensional rendering of an object. The model data can be received from one or more sensors that have scanned the object in three dimensions. Alternatively, the model data can be received from one or more other apparatuses that have been tasked with generating model data corresponding to the object. The model data can include information such as, but not limited to, coordinates for points on one or more different surfaces of the object, degrees of transparency at different points on the object, features of one or more materials that are embodied by the object, characteristics of layers of the object, mappings of occupied and/or empty spaces of the object, and/or any other features of an object that can be described by data. In some implementations, the object characterized by the model data can be an anatomical object, such as one or more physical features of a human body. The object can therefore be a section of the human body that includes different layers of tissue.

The method 500 can further include an operation 504 of determining an area of interest of the model data. Determining the area of interest of the model data can include, receiving a selection from a user indicating that a particular portion of the model data should be designated as the area of interest. For example, the model data can be presented at one or more user interfaces from which the user can select one or more different portions of the model data for designating the area of interest. By selecting the area of interest, further processing can be performed based on the area of interest in order to generate modified model data that can be used to print a three-dimensional model that details the area of interest. For instance, when the model data corresponds to a portion of the human body, the area of interest selected by the user can correspond to a diseased area of the portion of the human body. The diseased area can be, for example, an area that includes a tumor disposed between one or more layers of tissue of the human body. Therefore, the model data can characterize the tumor as well as the one or more layers of tissue, and the user can select the tumor as the area of interest by providing a selection input to a computing device that is presenting the model data to the user. The selection input can be a touch input, an input made by a peripheral device, a natural language input such as speech or text, and/or any other input that can identify a portion of data. The selection input can then be converted into coordinate data that characterizes the area of interest.

The method 500 can further include an operation 506 of generating a bounded region surrounding the area of interest. Generating the bounded region can include identifying a number of layers that are part of, or are otherwise located near, the area of interest. In some implementations, generating the bounded region can include identifying a layer that is located behind the area of interest and another layer that is located in front of the area of interest. Furthermore, in some implementations, generating the bounded region can include modifying the model data to include a perimeter region that surrounds the area of interest. The perimeter region can be generated to intersect the layer that is behind the area of interest and the other layer that is in front of the area of interest. Additionally, the model data can be modified such that the perimeter region includes one or more locations where the layer behind the area of interest and the layer in front of the area of interest at least partially overlap. In this way, the modified model data can include one or more locations where connectors can be placed in order to connect overlapping portions of the printed object to be generated based on the modified model data.

The method 500 can further include an operation 508 to determine whether the bounded region includes an interior surface that extends the entire bounded region. An interior surface can correspond to a surface that is behind the area of interest, faces away from a front surface of the object, extends through a portion of the object that is not visible without disassembling the object, and/or any other surface that can correspond to an interior surface of an object. Determining whether the bounded region includes an interior surface that extends the entire bounded region can include determining whether a back plate should be generated for the bounded region. Alternatively, determining whether a bounded region includes an interior surface that extends entire bounded region can include determining whether the interior surface should be considered the back plate. The back plate can be used as a support structure for one or more other layers of the model data, therefore the model date can be modified to incorporate the back plate along with one or more connectors that can be used to connect the other layers of the model data to the back plate.

When the bounded region includes an interior surface that extends the entire bounded region, the method 500 can proceed to operation 510 of generating connectors at the interior surface of the bounded region. By generating connectors at the interior surface of the bounded region, the model data will be modified to incorporate connectors upon which other layers of the model data can reside. For example, generating connectors at the interior surface of the bounded region can include modifying the interior surface of the bounded region to include a first portion of a connector and modifying a separate surface of a layer of the model data to include a second portion of the connector. In this way, if the model data is printed by a three-dimensional printer, the resulting printed object will include at least two layers that can be connected and/or disconnected using one or more connectors. In some limitations, generating connectors at the interior surface of the bounded region can include determining whether the area of interest overlaps the interior surface of the bounded region. If the area of interest overlaps a portion of the interior surface of a bounded region, the connectors can be located outside the portion of the interior surface of the bounded region, in order to avoid obstructing the view of the area of interest.

When the bounded region does not include an interior surface that extends over the entire bounded region, the method 500 can proceed to operation 512 for determining balance points for one or more interior surfaces of the bounded region. Determining balance points for the one or more interior surfaces of the bounded region can include identifying areas or points on the interior surface of the bounded region that correspond to thicker regions or thinner regions than other regions of the bounded region. Additionally, or alternatively, determining balance points can include identifying two or more points on each interior surface of the bounded region that is separate from the area of interest. In some implementations, determining balance points for the one or more interior surfaces of the bounded region can include identifying one or more points at one or more edges at the bounded region to designate as balance points. In some implementations, determining balance points can include generating a line of best fit, generating one or more center lines that can be linear or non-linear and extend through one or more layers within the bounded region, and/or any other method for generating balance points.

The method 500 can further include an operation 514 of generating connectors for the one or more interior surfaces of the bounded region. The connectors can be located at the balance point identified and operation 512. In this way, the one or more interior surfaces of the bounded region can be secured together when the model data is used to print the object that includes the one or more interior surfaces. Layers of the object can then be released or secured using the connectors, and the appearance of the object can be restored each time the object is reassembled. Furthermore, the connectors can be located away from the area of interest to avoid obstructing the area of interest when the printed object is at least partially disassembled or partially assembled.

FIG. 5B illustrates a continuation of method 500, referred to as method 518, as indicated by the transition point "A" encircled in both FIG. 5A and FIG. 5B. In some implementations, the method 518 can be a stand-alone implementation for processing model data in order to generate connectors that can be used when an object is printed from the model data. The method 518 can include an operation 520 of identifying one or more layers of the bounded region of the model data. The model data can include information for determining density, and/or any other properties of the object characterized by the model data. Therefore, in order to identify one or more layers of the bounded region of the model data, the model of data can be processed to determine how density and/or any other properties of the model data change throughout the three-dimensions of the model data. For example, when the model data includes a layer of skin, multiple organ layers, and bone, identifying one or more layers can include determining differences in density between the skin, organs, and/or bone. Data corresponding to each of the different densities and/or properties can be tagged or modified to designate each of the different layers. For instance, because bone has a relatively high density, data corresponding to higher density portions of the model data can be tagged or modified to designate the data as being part of a bone layer. Furthermore, data corresponding to a density that is less than the density of the bone layer can be designated or tagged as being a different layer from the bone layer.

The method 518 can further include an operation to 522 of determining whether the area of interest is at least partially enveloped by the one or more identified layers of the bounded region at the model data. Determining whether the area of interest is at least partially enveloped by the one or more identified layers can include comparing coordinate data associated with the area of interest with coordinate data corresponding to one or more of the identified layers. When the area of interest has coordinates that are shared by one or more of the identified layers, the area of interest can be considered at least partially enveloped by the one or more identified layers. Moreover, if the area of interest is between a layer in a z-direction, where the z-direction corresponds to the direction at which the connectors of the printed object can be attached and removed, the area of interest can also be considered at least partially enveloped by the layer. For instance, if the area of interest corresponds to a location within an organ that has a cavity, such as the heart, a layer of the heart can extend from behind the area of interest to the front of the area of interest, thereby at least partially enveloping the area of interest. By determining whether the area of interest is at least partially enveloped by one or more layers identified within the bounded region, the model data can be modified in order to provide structure(s) that can allow the printed object to be disassembled and reassembled with consistency.

When the area of interest is at least partially enveloped by the one or more identified layers of the bounded region, the method 518 can proceed to operation 524, which can include modifying the model data to identify an area of separation between the one or more layers. An area of separation can be a two-dimensional or three-dimensional area corresponding to a cross-section of one or more of the identified layers within the bounded region. The area of separation can be symmetrical, concave, convex, convoluted, polygonal, linear, curved, and/or any other shape that can correspond to a cross section of at least a portion of an object. In some implementations, modifying the model data to incorporate an area of separation between the one or more layers can include identifying portions of the one or more layers corresponding to thicker regions. For example, although it may be desirable to provide a two-dimensional cross-section of an organ such as the heart in order that the organ can be separated to reveal a particular area of interest, from a structural standpoint, it may also be desirable to provide a three-dimensional cross-sectional area. In other words, the area of separation can be a three-dimensional cross-sectional area that can separate one or more identified layers of the bounded region. By separating one or more identified layers of the bounded region in this way, the model data will characterize portions of the rendered object that can be separated, when printed in three-dimensions, in order that the area of interest at least partially enveloped by the one or more identified layers can be examined by a clinician or other user.

When the model data has been modified to identify the area of separation between the one or more identified layers, the method 518 can proceed to operation 526, which can include modifying the model data to incorporate additional connectors at the area of separation between the one or more identified layers. The additional connectors can be disposed over one or more areas of separation between the one or more identified layers. For example, when the area of interest is identified as being within an organ having a cavity, such as the stomach, the connectors can be disposed about a perimeter of the stomach as rendered by the model data. Furthermore, the perimeter can be a boundary of the area of separation between the one or more identified layers, as provided at operation 524. In some implementations, when the area of interest is at least partially enveloped by one or more layers, the type of connector can be automatically designated by the process that is generating the connectors. For example a snap and lock connector can be disposed about the area of separation between the one or more layers when the area of interest is at least partially enveloped by the one or more layers. When the area of interest is not at least partially enveloped by the one or more layers, the connector can be a rod and aperture connector, where the rod can rest inside the aperture with less friction than the friction of a snap and lock connector.

In some implementations, when the area of interest is not at least partially enveloped by the one or more identified layers of the bounded region, the method 518 can include an operation 528. The operation 528 can include modifying the model of data to incorporate additional connectors between a layer that includes an outermost surface and a layer that includes an interior surface. For example, an outermost surface can correspond to a layer that is located opposite the back plate or lower most area for supporting the other layers of the object when the model data is printed. The interior surface can correspond to one or more interior layers of the object when the object is printed. Therefore, the additional connectors can be disposed between at least two layers that will hide the additional connectors from view when the object is printed. Furthermore, the connectors can be disposed away from the area of interest in order to not obstruct the view of the area of interest when the printed object is fully assembled or at least partially disassembled. In some implementations, the method 518 can optionally include an operation 530 of printing the model data as a three-dimensional model using a three-dimensional (3D) printer. The 3D printer can print the 3D model with the connectors and various layers, such that the 3D model can be disassembled and reassembled for examining the area of interest, and/or any other portion of the 3D model.

Figure 6:
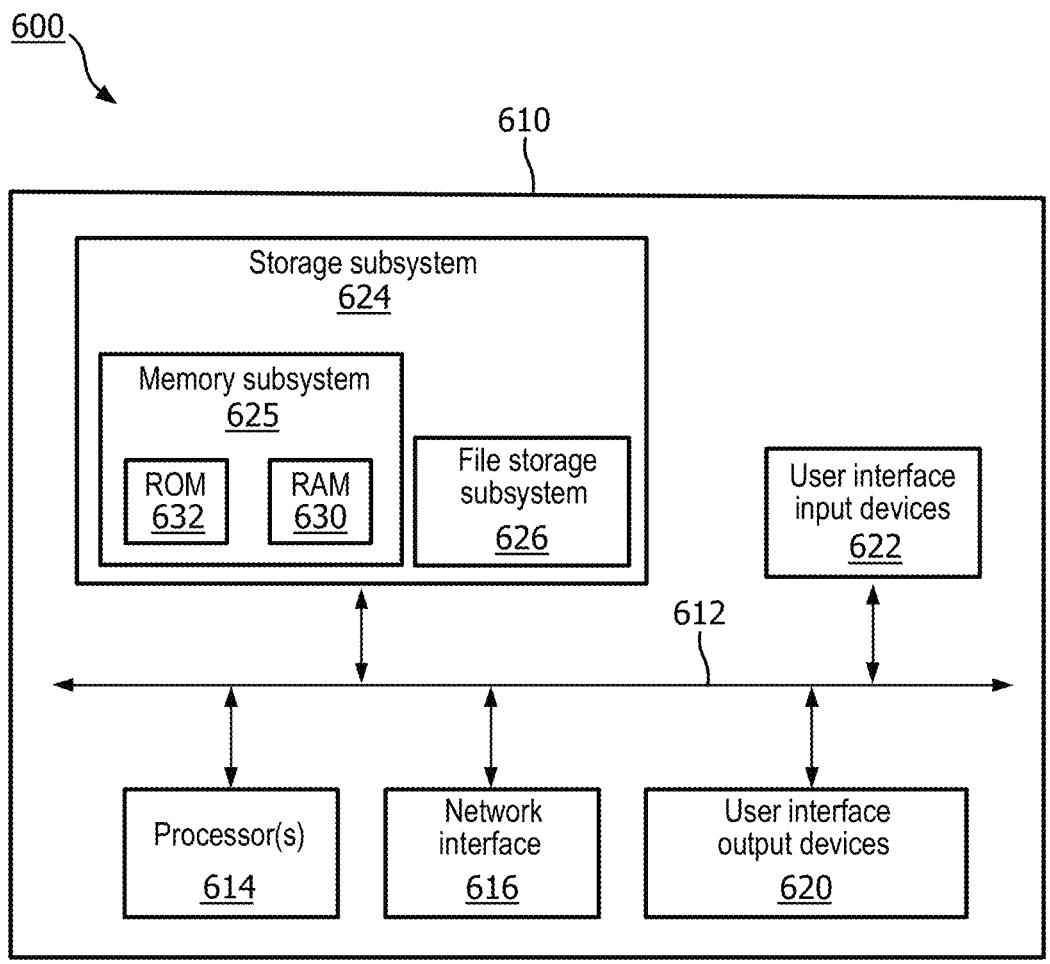
FIG. 6 is a block diagram of an example computer system.

FIG. 6 is a block diagram 600 of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices.

In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of methods 500 and 518, any of the operations and/or tasks discussed herein, and/or to implement one or more of the computing device 402, remote devices 420 and 424, and/or any other apparatus or process discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In some implementations, the type of connector selected for incorporating between the outermost surface and the interior surface can be based on a rigidity of one or more layers of the object. For example, a layer that is has a rigidity value that is less than a rigidity threshold can be assigned a connector with more friction, such as a snap and lock connector. A layer that is that has a rigidity value that is equal to or greater than the rigidity threshold can be assigned the connector with less friction, such as a rod and aperture connector. In this way, the appearance and structure of the printed object can be preserved when assembled and disassembled multiple times, despite there being differences in rigidity of the layers of the printed object.

In some implementations, the connectors can be configured to extend in one or more directions, such as a z-direction, a y-direction, an x-direction, and/or any other direction that connector can be disposed in order to preserve the appearance and/or structure of a three-dimensional a printed object. For instance, when the area of interest corresponds to a tumor that is located at, or connected to, a side of an organ, and therefore has no direct connection to a layer of the object in a z-direction, a connector can be automatically assigned to the layer and arranged to extend in a direction that is perpendicular or normal to the layer or the side of the organ. Furthermore, the connector that is selected can be a snap and lock connector or any other connector that has a higher amount of friction than a rod and aperture connector.

In some implementations, the location of a connector can be based on a distance from an edge of the area of interest, to an edge of the layer that will include at least a portion of the connector. For instance, for each distance that satisfies a threshold, a connector can be automatically assigned to the midpoint of the length of the layer corresponding to that distance. Moreover, the diameter, shape, and/or thickness of a connector can also be based on the distance from the edge of the area of interest to an edge of the layer that will include at least the portion of the connector. In this way, connector shape can be directly or indirectly proportional to the distance between the edge of the area of interest and the edge of the layer that will include at least the portion of the connector. For instance, when the distance is less than a threshold distance, the connector can be automatically assigned a first diameter, and when the distance is equal to or greater than the threshold distance, the connector can be automatically assigned a second diameter that is larger than the first diameter.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

What is claimed is:

1. A method implemented by one or more processors, the method comprising:
   receiving model data corresponding to a three-dimensional rendering of an object that includes a plurality of layers that are identified by the model data;
   identifying a location corresponding to overlapping and non-intersecting portions of a first layer of the plurality of layers and a second layer of the plurality of layers; and
   modifying, in response to identifying the location, the model data to incorporate structural data that characterizes a support structure configured to be integral to the first layer and the second layer at the identified location.

2. The method of claim 1, wherein the structural data further characterizes a detachable connector.

3. The method of claim 2, wherein the structural data comprises first connector portion data that characterizes a first portion of the detachable connector that is connected to the first layer, and second connector portion data that characterizes a second portion of the detachable connector.

4. The method of claim 2, wherein the detachable connector includes a first volume and a second volume, the first volume at least partially enveloping the second volume.

5. The method of claim 1, further comprising:
   receiving a selection for incorporating a bounding region into the model data, wherein the bounding region is configured to isolate regions of the plurality of layers from the model data.

6. The method of claim 5, further comprising:
   receiving a separate selection of an area of interest within the bounding region, wherein identifying the location includes locating a portion of the model data that is separate from the area of interest.

7. The method of claim 6, wherein the area of interest corresponds to a third layer of the plurality of layers and is disposed between the first layer and the second layer.

8. The method of claim 7, further comprising:
   modifying, in response to receiving the separate selection of the area of interest, the model data to incorporate additional structural data that characterizes a separate support structure configured to be integral to at least the third layer.

9. A method implemented by one or more processors, the method comprising:
   receiving model data corresponding to a three-dimensional rendering of an object, wherein the three-dimensional rendering includes a plurality of layers that are identified by the model data;
   determining an area of interest corresponding to a portion of a first layer of the plurality of layers;
   modifying the model data to include bounding region data that characterizes a bounded region surrounding the portion of the first layer; and when the portion of the first layer is disposed between a second layer of the plurality of layers and a third layer of the plurality of layers:
modifying the model data to incorporate support structure data that characterizes a support structure that is integral to at least the first layer and disposed within the bounded region.

10. The method of claim 9, further comprising:
modifying the model data to include support structure data that characterizes one or more three-dimensional support structures integral to at least one layer of the plurality of layers.

11. The method of claim 9, further comprising:
modifying the model data to incorporate support plate structural data that characterizes a support plate that includes one or more three-dimensional support structures configured to support at least one layer of the plurality of layers.

12. The method of claim 11, further comprising:
when the second layer is an outer-most layer relative to the support plate:
generating material data corresponding to the second layer that identifies the second layer as an at least partially transparent layer.

13. The method of claim 11, wherein the support structure that is integral to at least the first layer is a detachable connector and the one or more three-dimensional support structures of the support plate are fixed connectors that are different than the detachable connector.

14. The method of claim 13, wherein the detachable connector is characterized by volume data that identifies a first volume at least partially enveloped by a second volume.

15. A method implemented by one or more processors, the method comprising:
receiving a selection of an area of interest of a three-dimensional rendering of an object, wherein the three-dimensional rendering includes a plurality of layers;
determining that model data, corresponding to the three-dimensional rendering of the object, includes an outer surface and an inner surface, wherein the outer surface is integral to a first layer of the plurality of layers of the object and the inner surface is integral to a second layer of the plurality of layers of the object;
modifying the model data to incorporate support structure data, wherein the support structure data characterizes a support structure that is integral to the second layer of the plurality of layers, wherein the support structure is configured to support at least one other layer of the plurality of layers; and
when the area of interest is disposed between the first layer and the second layer: modifying the model data to incorporate additional support structure data to characterize an additional support structure that is at least partially integrated into the first layer or the second layer.

16. The method of claim 15, further comprising:
when the area of interest is integral to the first layer:
modifying the model data to incorporate the additional support structure data to characterize a separate support structure that is at least partially integrated into an area of the first layer that is separate from the area of interest.

17. The method of claim 16, further comprising:
when the area of interest is integral to the first layer:
modifying the model data to incorporate cross-sectional data to characterize a first portion and a second portion of the first layer, wherein the first portion and the second portion are detachable portions of the first layer.

18. The method of claim 17, wherein modifying the model data to incorporate the cross-sectional data includes identifying a perimeter of a cross-section characterized by the cross-sectional data on which to incorporate the separate support structure.

19. The method of claim 15, further comprising:
providing, based on determining that the model data includes the outer surface, material data that designates the first layer as an at least partially transparent layer.

20. The method of claim 15, wherein the object is an anatomical object and the model data is generated by a scanning device.

* * * * *